US012782961B2

(12) United States Patent
Erlewein et al.

(10) Patent No.: US 12,782,961 B2
(45) Date of Patent: Nov. 3, 2026

(54) METHOD FOR THE SAFE OPERATION OF A MOBILE MACHINE

(71) Applicant: SICK AG, Waldkirch (DE)

(72) Inventors: Patrick Erlewein, Vörstetten (DE); Max Franz, Oberried (DE)

(73) Assignee: SICK AG, Waldkirch (DE)

( * ) Notice: Subject to any disclaimer, the term of this patent is extended or adjusted under 35 U.S.C. 154(b) by 30 days.

(21) Appl. No.: 19/040,201

(22) Filed: Jan. 29, 2025

(65) Prior Publication Data

US 2025/0258500 A1 Aug. 14, 2025

(30) Foreign Application Priority Data

Feb. 9, 2024 (DE) ......................... 102024103644.3

(51) Int. Cl.
*G05D 1/00* (2024.01)
*G05D 1/622* (2024.01)
*G05D 111/10* (2024.01)

(52) U.S. Cl.
CPC .......... *G05D 1/622* (2024.01); *G05D 2111/10* (2024.01)

(58) Field of Classification Search
CPC ............................ G05D 1/622; G05D 2111/10
USPC ........................................................ 701/301
See application file for complete search history.

(56) References Cited

U.S. PATENT DOCUMENTS 9,796,085 B2 * 10/2017 Richter .................. B25J 9/1666
2019/0220033 A1 * 7/2019 Cho ..................... G05D 1/0225
2023/0048039 A1 2/2023 Kokushi et al.
2023/0219237 A1 7/2023 Galluzzo et al.

FOREIGN PATENT DOCUMENTS

DE 19959440 C2 12/2001
DE 10324627 A1 1/2005
DE 102010007025 A1 8/2011
DE 102010046327 A1 * 3/2012 .............. F16P 3/144
DE 112011104645 T5 10/2013
(Continued)

OTHER PUBLICATIONS

Official communication dated Nov. 12, 2025 issued in corresponding European Application No. 24221836.0.

*Primary Examiner* — Erin M Piateski
*Assistant Examiner* — Michael T Dowling
(74) *Attorney, Agent, or Firm* — Nath, Goldberg & Meyer; Jerald L. Meyer

(57) ABSTRACT

A mobile machine includes: a travelable base; a movable machine part arranged at the travelable base and having a hazardous section; and a securing apparatus having one or more sensors and arranged at the movable machine part. A method for the safe operation of a mobile machine includes that the mobile machine is selectively operated in a work mode, in which the movable machine part performs working movements while the travelable base is stationary, or in a travel mode in which the travelable base performs travel movements while the movable machine part assumes a defined travel position. The securing apparatus monitors a respective protective volume that corresponds to a defined environment of the hazardous section in the work mode and corresponds to a defined environment of the travelable base in the travel mode. In the event of an object engaging into the respective protective volume, a safety-related reaction is triggered.

21 Claims, 1 Drawing Sheet

(56) References Cited

FOREIGN PATENT DOCUMENTS

| | | | |
|---|---|---|---|
| DE | 112016002057 | A1 | 1/2018 |
| DE | 102020214290 | A1 | 5/2022 |
| DE | 102021119372 | A1 | 2/2023 |
| EP | 3136127 | A1 | 3/2017 |

* cited by examiner

METHOD FOR THE SAFE OPERATION OF A MOBILE MACHINE

The invention relates to a method for the safe operation of a mobile machine, in particular as part of a human-robot interaction, wherein the machine comprises a travelable base; a movable machine part arranged at the travelable base and comprising a hazardous section; and a securing apparatus arranged at the movable machine part and comprising one or more sensors.

Robots or comparable machines are above all used in industrial environments to perform certain tasks. This in particular relates to tasks during which particularly large forces have to be exerted and/or which have to be performed at a high speed and with a high precision, in particular if the respective task very often is to be performed in the same way. However, there are also tasks that can be performed better by a human than by a machine. This in particular relates to tasks that are difficult to automate, for instance because they require experience and/or a high degree of adaptability. In processes that involve both work of the one kind and work of the other kind, it can therefore be expedient if humans and machines work together to combine their respective strengths as efficiently as possible.

The nature of the cooperation can be different in this respect. For example, the working zones of a robot and a human can merely overlap, wherein no direct interaction between the robot and the human takes place, or wherein an interaction is only provided when the robot is stationary. Such a form of cooperation is also called human-robot cooperation. However, the cooperation can also go so far that a direct interaction up to a scheduled contact between a human and a robot takes place, for instance when the human and the robot simultaneously work on one workpiece or the robot is hand-guided. This kind of cooperation is also called human-robot collaboration. With respect to the present invention, human-robot interaction is to be understood in a rather broad sense and can comprise all the mentioned forms of cooperation, in particular both human-robot collaboration and human-robot cooperation.

Due to a human-robot interaction, high demands result with respect to the safety of the persons involved since the machines involved can in particular pose a danger to the persons due to their power and speed. The aforementioned hazardous section is in this respect a section of the movable machine part from which or from whose structure a particular hazard generally arises for a person working with the machine. In principle, however, the machine as a whole can also pose a danger to persons in its environment. This applies all the more if the machine is not a stationary machine, in which substantially only the movable machine part is movable, but a mobile machine that can change its overall position since its base is movable.

Precautions must therefore be taken to prevent personal injury wherever possible. Such precautions include both passive measures, such as avoiding hard or sharp edges at outer sides of the machine and rather providing soft and/or rounded surfaces, and active safety mechanisms that trigger a specific safety-related reaction in the event of a danger to a person to avert this danger. Passive measures cannot always be implemented comprehensively. For example, a tool (for example, a gripper or a dispenser) that serves to process a workpiece can be provided at a free end of a robot arm, wherein the tool tip must be configured to fulfill its function in a way that may be dangerous for a person working together with the machine, for example since the person can injure himself at the tool. In order nevertheless to rule out an endangerment as far as possible in such a case, it may, for instance, be expedient as an active measure to ensure that the tool can only ever be operated at a certain safety distance from persons present.

If, as part of a human-robot collaboration, robots or comparable machines, such as AGVs (Automated Guided Vehicles), AGCs (Automated Guided Containers) or drones work together with people in a defined working environment without being permanently spatially separated from one another by a separation apparatus, a danger to a person involved in the collaboration can in particular arise if a collision between the machine and the person occurs. This danger can be countered in various ways.

One possibility is that the machine is only operated under the direct control of a human who can thus ensure that neither he nor other persons are endangered by the machine. However, if the control of the machine takes place automatically or the machine even works autonomously, the safety of the persons working together with the machine can be ensured according to a further safety concept by limiting the movements of the machine, in particular its force and speed, such that, in the event of a collision, the collision is highly unlikely to cause pain or injury to the respective person. However, such a safety concept based on limiting the machine is only possible if the work for which the machine is used does not require high forces or speeds. Furthermore, there may be sections of the machine that pose a hazard even at low forces and speeds, for example because they are pointed, sharp or hot.

According to an alternative safety concept, the aim is to prevent a collision between a person and the machine from occurring in the first place. For this purpose, it is ensured that the machine can only be put into operation at all if there is no human in a defined environment of the machine or at least of a respective hazardous section of the machine, and that the machine is immediately slowed down or stopped soon as a human enters the defined environment. The environment can in particular be defined by a safety distance from the machine or the hazardous section and can in this respect be static or, if the environment is defined relative to a moving element of the machine, also dynamic. The respective environment is constantly monitored in this respect so that the presence of a human in the environment can immediately be reacted to with a suitable safety measure.

The technology used for such safety concepts must work particularly reliably and must therefore meet high security requirements. For example, it may be possible that a mobile machine has to comply with the EN ISO 3691-4:2020 standard for driverless industrial trucks. Furthermore, it may be necessary for sensors used to comply with the standards EN ISO 13849-1:2015 and EN ISO 13849-2:2012 for machine safety and the device standards EN IEC 61496-1:2020 and EN IEC 61496-2:2020 for electro-sensitive protective equipment (ESPE). For this purpose, a series of measures must be taken such as a secure electronic evaluation by redundant, diverse electronics and a functional monitoring or a monitoring of the contamination of optical components.

For example, at the distal (free) end of a robot arm, which has an end effector (for example a tool or a tool mount for a tool), from which a danger for a person working together with the robot arm generally arises, a securing apparatus can be provided that safeguards against the risk emanating from this hazardous section of the robot arm by monitoring a protective volume enveloping the hazardous section. The protective volume can be realized by means of a plurality sensors by which it can be determined whether an object engages into the protective volume or not. If an engagement into the protective volume is detected, it is possible to react thereto in a safety-oriented manner, in particular by slowing down or stopping the movement of the robot arm.

In this respect, such securing apparatus are not only expedient for a movable machine part (e.g. a robot arm), but can also be useful for the entire machine in the case of a mobile machine. For this purpose, it can be provided in the same way as for the movable machine part that at least a part of an environment of the travelable base of the mobile machine is monitored and, in the event of an engagement into the protective volume defined in this way, a safety-related reaction takes place, in particular by slowing down or stopping the travel movement of the mobile machine. To monitor the environment of the travelable base, sensors are in this respect again required to scan the environment. Typically, securing apparatus comprising a plurality of sensors are for this purpose arranged at at least that side of the travelable base which corresponds to the direction in which the mobile machine can move forward. For example, sensors can be provided in the middle of this side and/or at both ends of this side (corners of the travelable base), in particular to be able to reliably detect substantially the entire region in front of the travelable base in the direction of travel also when cornering. In the case of mobile machines that can also travel backwards, one or more corresponding securing apparatus are then also provided at the opposite side of the travelable base.

However, such a large number of securing apparatus, each of which can comprise a plurality of sensors, has a negative effect on the costs of the mobile machine. Furthermore, with each additional component, the weight of the mobile machine also increases that therefore requires more powerful motors (in particular for the travel) than would be the case with a lower weight. Furthermore, the power consumption of the mobile machine also increases since the securing apparatus have to be supplied with energy. This means that more powerful batteries must be provided that also additionally increase the weight of the mobile machine and furthermore take longer to charge so that the ratio between working and charging times of the mobile machine deteriorates. Finally, each additional component also has a negative effect on functional safety indicators, such as the $MTTF_D$ value (Mean Time To Dangerous Failure), since each additional cabling is an additional potential source of error. It is an object of the invention to avoid these disadvantages.

This object is satisfied by a method for the safe operation of a mobile machine having the features of claim 1 and by a machine having the features of claim 15.

The method according to the invention is preferably suitable as part of a human-robot interaction, in particular as part of a human-robot collaboration, and serves for the safe operation of a mobile machine that comprises a travelable base; a movable machine part arranged at the travelable base and comprising a hazardous section; and a securing apparatus arranged at the movable machine part and comprising one or more sensors. The mobile machine can, for example, be a mobile manipulator.

The travelable base can, for example, comprise at least one chassis and a drive for generating a travel movement of the chassis. The travel capability of the base is in this respect not to be understood passively; it is therefore not limited to the fact that the base can be traveled, but can also include the fact that the base itself can travel (by means of the aforementioned drive), in particular also autonomously. For example, the travelable base can be configured in the manner of a driverless transport system.

The travelable base can, for example, have wheels with which it can roll on a surface (for example, a floor or rails) or it can have, in the manner of a tracked vehicle, a chain or belt with which it can roll on the surface. Said travel capability of the base is in this respect not restricted to a specific mode of transportation.

The movable machine part is arranged, preferably directly, at the travelable base, on the one hand, and is movable (relative to the travelable base), on the other hand. For example, the movable machine part can have an elongate, in particular arm-like, course whose one end (proximal end) is fixedly connected to the travelable base and is thus stationary relative to the travelable base and whose other end (distal end) is movable at least between different positions, preferably at least largely freely.

The movability is in this respect not to be understood as a merely general movability in the sense that the movable machine part can only be moved passively (bent, pivoted or realigned in any other way), for instance by a user; rather, the movable machine part is configured to be driven to move itself. For this purpose, the mobile machine can comprise one or more corresponding drives that can be part of the movable machine part or the travelable base and can be controlled to move the movable machine part.

The movable machine part is preferably configured as a manipulator, in particular as a manipulator arm or robot arm. In this regard, the mobile machine can be a mobile robot. At its free (distal) end, the movable machine part can have a gripper, a tool, a tool holder or another end effector so that certain work can be performed by means of the movable machine part. The movable machine part is in this respect not necessarily limited to a single specific type of work, but can ideally be flexibly used for different tasks. This can be achieved, for example, by the movable machine part comprising a plurality of tools and/or one tool holder for receiving various tools.

The movable machine part has a hazardous section. The movable machine part is in this respect not limited to exactly one hazardous section, but can also have a plurality of hazardous sections (of the same kind or of different kinds). The (at least one) hazardous section can generally be any desired section of the movable machine part for which it is intended to be ensured that persons working together with the machine is protected therefrom. In this regard, such a section that, for instance due to its structure or function, poses a risk to respective persons can in particular be considered as a hazardous section.

For example, the hazardous section can comprise said end effector and possibly any adjoining regions of the movable machine part. In particular, if the movable machine part is elongate or arm-like, the hazardous section can be arranged at said free end (which is distal with respect to the travelable base) of the movable machine part. Due to the movability of the movable machine part, the hazardous section is also movable, in particular relative to the travelable base.

The securing apparatus is provided to secure the environment of the movable machine part from being endangered by the hazardous section. The securing apparatus comprises one or more sensors and is arranged, preferably directly, at the movable machine part. The securing apparatus is in particular arranged completely at the movable machine part and can therefore be regarded as part of the movable machine part. In this regard, the securing apparatus moves with the movable machine part when the latter moves. In particular, the securing apparatus does not comprise a sensor that is not arranged at the movable machine part. The securing apparatus with its sensors is expediently arranged in the immediate vicinity of the hazardous section to be able to monitor the environment of the hazardous section as comprehensively as possible.

The sensors of the securing apparatus are preferably optoelectronic sensors, for example distance sensors, that measure distances according to the time-of-flight principle based on time-of-flight differences between emitted and received radiation. Alternatively thereto, the sensors of the securing apparatus can also be radar sensors, for example. In principle, all kinds of sensors that make it possible to detect the entry of an object into a protective volume monitored by the sensors can be considered.

The method according to the invention comprises that the mobile machine is selectively operated in a work mode or in a travel mode. The mobile machine can therefore generally be operated both in the one mode and in the other mode, but not in both modes at the same time. The decisions as to when the mobile machine is operated in which mode can be made by a human depending on the situation, can be predefined based on a fixed or dynamic schedule or can take place autonomously. The work mode and the travel mode can in particular alternate depending on the situation. In this regard, the mobile machine is therefore operated alternately in the work mode and in the travel mode. For example, the method can comprise operating the mobile machine in the work mode in a first period and in the travel mode in a second period that is different from the first period, wherein the first and the second period preferably, but not necessarily, at least substantially follow one another directly. In a third period, the mobile machine can then be operated in the work mode again, etc.

The method according to the invention further comprises: that in the work mode the travelable base is stationary, the movable machine part performs working movements, and the securing apparatus is in this respect moved along such that it monitors a protective volume, which corresponds to a defined environment of the hazardous section, by means of the one or more sensors, wherein, in the event of an engagement (detected due to the monitoring) of an object into the protective volume, a safety-related reaction is triggered that comprises adapting the (currently performed) working movement; and that, in the travel mode, the travelable base performs travel movements, the movable machine part assumes a defined travel position, and the securing apparatus is oriented in this respect (due to the orientation of the movable machine part in the defined travel position) such that it monitors a protective volume, which corresponds to a defined environment of the travelable base, by means of the one or more sensors, wherein, in the event of an engagement (detected due to the monitoring) of an object into the protective volume, a safety-related reaction is triggered that comprises adapting the (currently performed) travel movement.

The work mode and the travel mode in particular differ in terms of which part of the mobile machine moves in each case: In the work mode, the movable machine part performs working movements while the travelable base is stationary (does not travel); in the travel mode, on the other hand, the travelable base performs travel movements (travels) while the movable machine part indeed inevitably moves along with the travelable base since it is arranged thereat, but assumes a defined travel position relative to the travelable base. In this respect, a plurality of different travel positions can also be defined, of which the movable machine part assumes a respective travel position in the travel mode, in particular depending on the respective travel movement of the travelable base, as will be explained further below. However, the travel position preferably does not change as long as the travel movement does not change (i.e. in particular at least neither with respect to its speed nor with respect to its direction). In the travel mode, the movable machine part therefore not only does not perform any working movements, but is at least substantially stationary (relative to the travelable base).

Said working movements of the movable machine part take place relative to the stationary travelable base, while said travel movements of the travelable base take place relative to the environment of the mobile machine, for example relative to a workshop in which the mobile machine is operated. The working movements are referred to in the plural since the movable machine part can perform a plurality of different working movements, for example one or more sequences of a respective plurality of individual working movements. At a specific point of time, however, the movable machine part in this respect only performs a single one of the total performed working movements in each case. When a working movement is referred to in the singular, it thus refers to the working movement of the movable machine part that is currently performed at a respective point in time. In the same way, the mobile base can perform a plurality of different travel movements, of which said mobile base performs a respective one at a respective point in time. When a travel movement is referred to in the singular, it thus refers to the travel movement of the travelable base that is currently performed at a respective point in time.

The respective travel movement can in particular be defined by its speed (travel speed) and, if the travelable base can travel in different directions (for example forwards and backwards and possibly corners), additionally by its direction (direction of travel). In particular, a respective travel movement can be completely determined by its speed and its direction.

Both in the work mode and in the travel mode, the same securing apparatus in each case monitors a respective protective volume by means of its sensors, wherein the protective volume corresponds to a defined environment of the hazardous section in the work mode and corresponds to a defined environment of the travelable base in the travel mode. In particular, the same sensors are therefore used both in the work mode and in the travel mode for monitoring the respective protective volume. To distinguish the protective volume monitored in the work mode and the protective volume monitored in the travel mode from one another, these protective volumes could also be referred to as the first protective volume or second protective volume or also as the working protective volume or travel protective volume.

The monitoring takes place specifically with respect to engagements into the respective protective volume. As part of the monitoring, it is therefore detected whether an object (e.g. a body part of a person interacting/collaborating with the mobile machine) engages into the respective protective volume, but this engagement is not provided. In this respect, the engagement is to be understood in relative terms; it therefore does not matter whether the object or the protective volume moves in this respect. Different threshold values can in this respect be defined that correspond to different degrees of the engagement so that the reaction can be different depending on the degree.

The monitoring can comprise the acquisition of (distance) data by means of the sensors within a detection zone of the respective sensor and the evaluation of these data with respect to whether an engagement into the protective volume exists. For this purpose, the data can, for example, be compared with a threshold value (one of a plurality of threshold values, if applicable). The evaluation can take place in the securing apparatus or outside the securing apparatus, for example in a control apparatus for the movable machine part or for the travelable base, as described in more detail below.

Data (distances) do not necessarily have to be acquired in the entire respective protective volume for the monitoring. This is because it can be sufficient if the sensors detect the edges of the protective volume that are (must be) penetrated by an object engaging into the protective volume.

Since the protective volume is arranged relative to the hazardous section in the work mode and relative to the travelable base in the travel mode, it is not spatially stationary, but moves with the hazardous section during the working movements and with the travelable base during the travel movements. This is achieved in that the securing apparatus is arranged at the movable machine part and therefore moves with the movable machine part in the work mode during working movements of the movable machine part (in particular, all the sensors of the securing apparatus in this respect also move with the movable machine part, preferably specifically with the hazardous section of the movable machine part); in the travel mode, the movable machine part assumes said travel position, whereby the securing apparatus moves with the travelable base in an arrangement relative to the travelable base, said arrangement corresponding to the travel position. In this way, the protective volume can be defined relative to the hazardous section (namely as a defined environment of the hazardous section) in the work mode and relative to the travelable base (namely as a defined environment of the travelable base) in the travel mode.

Said environment of the hazardous section and said environment of the travelable base can in particular be defined with respect to their respective dimensions, preferably with respect to their respective direction-dependent extent away from the hazardous section or the travelable base. For this purpose, it is expedient if the sensors of the securing apparatus are arranged adjacent to the hazardous section and, in the travel mode in the travel position of the movable machine part, are arranged comparatively close to (a side, which is surrounded by the monitored environment, of) the travelable base. It is generally expedient that the environment of the hazardous section, which is monitored in the work mode, directly adjoins the hazardous section or the environment of the travelable base, which is monitored in the travel mode, directly adjoins the travelable base.

The direction-dependent extent of the respective environment can, for example, be determined by distance threshold values (different for the different sensors) for distances acquired by the sensors, wherein the distance threshold values decisive in the travel mode differ from the distance threshold values decisive in the work mode.

The environment of the hazardous section monitored in the work mode and the environment of the travelable base monitored in the travel mode can furthermore each be dynamic, i.e. their respective dimensions can be situation-dependent. For example, the environment of the hazardous section monitored in the work mode can be temporarily reduced, for instance for an approach to a workpiece to be machined, and/or the environment of the travelable base monitored in the travel mode can depend on the speed of the respective travel movement.

In both the work mode and the travel mode, a respective safety-related reaction is triggered in the event of an object engaging into the respective protective volume. The safety-related reaction that may be triggered in the work mode and comprises adapting the (currently performed) working movement may also be designated as a work-safety-related reaction; the safety-related reaction that may be triggered in the travel mode and comprises adapting the (currently performed) travel movement may also be designated as a travel-safety-related reaction. If at least one of the sensors of the securing apparatus measures a distance value that falls below a distance threshold value corresponding to the currently relevant protective volume, this can, for example, be assessed as an engagement into the protective volume.

As a safety-related reaction to a detected engagement, the respective currently performed movement (working movement of the movable machine part or travel movement of the travelable base) is adapted. The adaptation can in particular comprise a change to the respective movement (in particular with respect to its direction and/or speed) that ideally leads to a reduction in the risk to the environment of the mobile machine by the hazardous section or by the mobile machine as a whole. For example, the adaptation can comprise the movable machine part, in the work mode, or the travelable base, in the travel mode, evading the respective object and/or slowing down or stopping completely.

A particular advantage of the present invention results from the fact that the same sensors of the same securing apparatus that are used in the work mode to monitor the environment of the hazardous section as a securing volume are used in the travel mode to monitor the environment of the travelable base as a securing volume. In particular, it can in this respect also be provided that the mobile machine in the travel mode monitors said environment of the travelable base solely by means of (the sensors of) the securing apparatus arranged at the movable machine part. It is thereby possible to omit additional securing apparatuses—to said securing apparatus—that are arranged at the travelable base. The mobile machine can therefore advantageously have fewer components, a lower weight and a reduced power consumption. The mobile machine can thereby be more cost-effective and furthermore offer improved functional safety.

According to an advantageous embodiment, the securing apparatus extends around the hazardous section. For example, the sensors (in particular all the sensors) of the securing apparatus can be arranged distributed around the hazardous section, for instance in a ring shape. The environment of the hazardous section monitored in the work mode can thereby appropriately surround or envelop the hazardous section. Ideally, the monitored environment in this respect has no interruptions along its periphery around the hazardous section. However, narrow gaps can be acceptable, in particular if they are smaller than the objects to be protected.

According to a further advantageous embodiment, said environment of the hazardous section, which is monitored in the work mode, extends around the hazardous section in at least one spatial plane such that the hazardous section is accessible from the outside only through this environment at least in directions in parallel with the spatial plane. Ideally, the monitored environment extends around the hazardous section such that the hazardous section is accessible from the outside only through the environment from all spatial directions. Since this can be difficult or impossible depending on the arrangement of the sensors, it is expedient to cover at least a large number of spatial directions, in particular an approach to the hazardous section in horizontal directions. In this way, it can be at least largely ruled out that an object comes into contact with the hazardous section without being detected by the securing apparatus.

In principle, it can be expedient if the sensors of the securing apparatus are non-contact distance sensors that are configured to detect the distance of a respective object from the respective sensor (if an object is located within the range of the respective sensor in its detection direction) in a respective detection direction (i.e. the detection direction of the respective sensor). The sensors can be configured as time-of-flight sensors or radar sensors, for example. Such sensors can be comparatively simply used in manner known per se to monitor the edges of a protective volume for an engagement into the protective volume.

According to an advantageous embodiment, the extent of the protective volume along a respective detection direction (i.e. the detection direction of a respective sensor of the securing apparatus) is defined by a respective threshold value, wherein, for at least some of the sensors, in particular all the sensors, of the securing apparatus, the respective threshold value is different, in particular greater, in the travel mode than in the work mode. In this way, in the work mode, the protective volume can be limited to a comparatively small immediate environment of the hazardous section, whereas, in the travel mode, the protective volume can extend from the securing apparatus over a comparatively large area, for example up to a floor on which the travelable base travels.

According to a further advantageous embodiment, the travelable base has a surface, wherein, in the travel mode, those sensors whose detection direction crosses the surface of the travelable base are deactivated. The surface can in particular be a work surface that is oriented at least substantially horizontally and/or at least substantially vertically upward facing. The work surface can, for example, serve to support one or more workpieces for a transport or for a machining by an end effector, which is provided at the movable machine part, on the work surface (directly or, if applicable, via a holder provided at the work surface). The movable machine part is preferably connected to the travelable base at that side thereof at which the work surface is also provided.

Depending on the orientation of the securing apparatus in the travel position, it is possible that a part of the travelable base extends into the detection zone of one or more of the sensors of the securing apparatus. Since these detection zones are usually not relevant for a safe operation of the mobile machine in the travel mode and to prevent the travelable base from being assessed as an object engaging into the protective volume and the safety-related reaction consequently being triggered, it is advisable to deactivate the corresponding sensors.

According to a further advantageous embodiment, said environment of the travelable base, which is monitored in the travel mode, extends beyond the travelable base at least in the direction of the respective (currently performed) travel movement. The protective volume monitored in the travel mode is thereby located (at least among other things) in front of the travelable base in the direction of travel. In this way, those hazards that result from the mobile machine approaching an object can be specifically avoided. Preferably, the monitored environment in this respect directly adjoins the travelable base at least in the respective direction of travel. Furthermore, the monitored environment preferably extends at least over the entire side of the travelable base oriented in the respective direction of travel.

According to a further advantageous embodiment, the travel position which the movable machine part assumes in the travel mode is dependent on the speed and/or on the direction of the respective (currently performed) travel movement. The orientation of the protective volume monitored by means of the sensor apparatus can thereby be suitably adapted to the respective travel movement for a reliable securing of the mobile machine. Advantageously, no additional actuators are in this respect required for the adaptation of the protective volume to a change in the travel movement since this can take place by a movement of the machine part that is movable anyway, namely by a change to the travel position of the movable machine part through which the sensor apparatus also changes its orientation. However, as long as the travel movement does not change, the travel position of the movable machine part preferably does not change either so that the protective volume remains constant (relative to the travelable base).

In particular, it can be provided that, in the travel mode, during a travel movement of the travelable base in a first direction, the movable machine part assumes a first travel position, in which the securing apparatus is oriented such that the monitored protective volume corresponds to a first environment of the travelable base that extends beyond the travelable base in the first direction, and, during a travel movement of the travelable base in a second direction different from the first direction, in particular opposite the first direction, said movable machine part assumes a second travel position in which the securing apparatus is oriented such that the monitored protective volume corresponds to a second environment of the travelable base that extends beyond the travelable base in the second direction. In this way, the securing apparatus can always so-to-say look in the respective direction of travel and can thereby always monitor that region towards which the mobile machine travels.

Alternatively or additionally, it can further be provided that, in the travel mode, during a travel movement of the travelable base at a first speed, the movable machine part assumes a first travel position, in which the securing apparatus is oriented such that the monitored protective volume corresponds to a first environment of the travelable base that extends beyond the travelable base in the direction of the travel movement and, during a travel movement of the travelable base at a second speed that is greater than the first speed, said movable machine part assumes a second travel position in which the securing apparatus is oriented such that the monitored protective volume corresponds to a second environment of the travelable base that extends further beyond the travelable base in the direction of the (respective) travel movement than the first environment. The respective monitored environment therefore extends further in the direction of travel at the second, higher speed than at the first speed so that objects can advantageously already be detected from a greater distance at a higher travel speed of the mobile machine. The travel movement at the first speed and the travel movement at the second speed can in particular have the same direction.

The described enlargement of the monitored environment at a higher speed can in particular be achieved by the securing apparatus being offset upwards in the second travel position compared to the first travel position, offset forwards in the direction of travel and/or tilted upwards about a horizontal axis.

Appropriate control units can be provided to control the movable machine part and the travelable base to perform working movements or travel movements. The mobile machine can in particular comprise a travel control unit for controlling the travelable base and a work control unit for controlling the movable machine part.

According to an advantageous embodiment, the securing apparatus evaluates data acquired by the sensors with respect to an engagement into the respective protective volume and, in the event of an engagement, outputs a corresponding signal (i.e. a signal corresponding to an engagement into the respective protective volume) to the respective control unit (namely in the work mode at least to the work control unit and in the travel mode at least to the travel control unit), wherein the respective control unit, when it receives the corresponding signal, triggers the respective safety-related reaction. In this respect, the data can in particular be continuously acquired by the sensors and can also be continuously evaluated by the securing apparatus. If the work control unit receives the signal corresponding to an engagement into the protective volume in the work mode, it triggers the (work) safety-related reaction that comprises adapting the (currently performed) working movement. If the travel control unit receives the signal corresponding to an engagement into the protective volume in the travel mode, it triggers the (travel) safety-related reaction that comprises adapting the (currently performed) travel movement.

In a generally similar but alternative embodiment, the securing apparatus outputs data acquired by the sensors to the work control unit and/or to the travel control unit, wherein the travel control unit and/or the work control unit, if the respective control unit has received the data from the securing apparatus, evaluates/evaluates these data with respect to an engagement into the respective protective volume and, in the event of an engagement, triggers/trigger the respective safety-related reaction. Such an embodiment differs from the above embodiment substantially in that the securing apparatus does not evaluate the acquired data, but outputs them directly to at least one of the control units. Therefore, the evaluation then first takes place in the respective control unit. In this respect, different possibilities are conceivable as to which control unit receives and evaluates the data in which mode.

For example, it can be provided that the securing apparatus outputs the data acquired by the sensors only to the work control unit in the work mode and only to the travel control unit in the travel mode, wherein the respective control unit then evaluates the data with respect to an engagement into the respective protective volume and, in the event of an engagement, triggers the respective safety-related reaction (i.e. adapts the working movements or the travel movements and controls the movable machine part or the travelable base accordingly).

Alternatively, it can be provided that the securing apparatus outputs the data acquired by the sensors in both modes, in each case to only one of the two control units that then evaluates the received data with respect to an engagement into the respective protective volume (corresponding to the current mode) and, in the event of an engagement into the respective protective volume, depending on the mode in which the mobile machine is currently operated, either triggers the respective safety-related reaction itself or outputs a signal corresponding to the engagement into the protective volume to the other control unit that then triggers the respective safety-related reaction.

Furthermore, it is also conceivable that the securing apparatus outputs the data acquired by the sensors in both modes to both control units, wherein, in the work mode, the work control unit and, in the travel mode, the travel control unit evaluates the received data with respect to an engagement into the respective protective volume and triggers the safety-related reaction in the event of an engagement, while the respective other control unit can ignore the received data.

The mobile machine according to the invention, which can in particular be a mobile robot, comprises a travelable base; a travel control unit for controlling the travelable base; a movable machine part, in particular a robot arm, arranged at the travelable base and comprising a hazardous section; a work control unit for controlling the movable machine part; and a securing apparatus arranged at the movable machine part and comprising one or more sensors, in particular one or more non-contact distance sensors. The mobile machine is selectively operable in a work mode, in which the movable machine part is controlled by the work control unit to perform working movements while the travelable base is stationary, or is operable in a travel mode in which the travelable base is controlled by the travel control unit to perform travel movements while the movable machine part assumes a defined travel position. According to the invention, the securing apparatus (the same securing apparatus in both the work mode and the travel mode) is in this respect configured to monitor a respective protective volume with respect to an engagement into the protective volume, wherein the protective volume corresponds to a defined environment of the hazardous section in the work mode and corresponds to a defined environment of the travelable base in the travel mode. The work control unit is configured, in the work mode, in the event of an object engaging into the respective protective volume, to adapt at least the (currently performed) working movement as a safety-related reaction, while the travel control unit is configured, in the travel mode, in the event of an object engaging into respective protective volume, to adapt at least the (currently performed) travel movement as a safety-related reaction.

The mobile machine as a whole is preferably configured to be operated in accordance with the method according to the invention for the safe operation of a mobile machine. The mobile machine can in particular be operated in accordance with one of the above-described embodiments of the method according to the invention. The features and advantages described for these methods also apply accordingly to the mobile machine operated in accordance with the respective embodiment.

According to an advantageous embodiment, the travelable base of the mobile machine has no sensors for monitoring said environment of the travelable base. In particular, no such sensors are arranged at the travelable base. Such sensors are not required since the monitoring of the environment of the travelable base in the travel mode preferably takes place solely by means of the securing apparatus provided at the movable machine part. In this way, no further securing apparatuses need to be provided in addition to the securing apparatus for the safe operation of the mobile machine in the travel mode.

The invention will be further explained only by way of example in the following with reference to the Figures.

In the Figures, an embodiment of a mobile machine 11 according to the invention is shown that is configured to be operated in accordance with at least one embodiment of the method according to the invention. The mobile machine 11 is configured as a mobile manipulator and comprises a travelable base 13 and a movable machine part 15.

Figure 3:
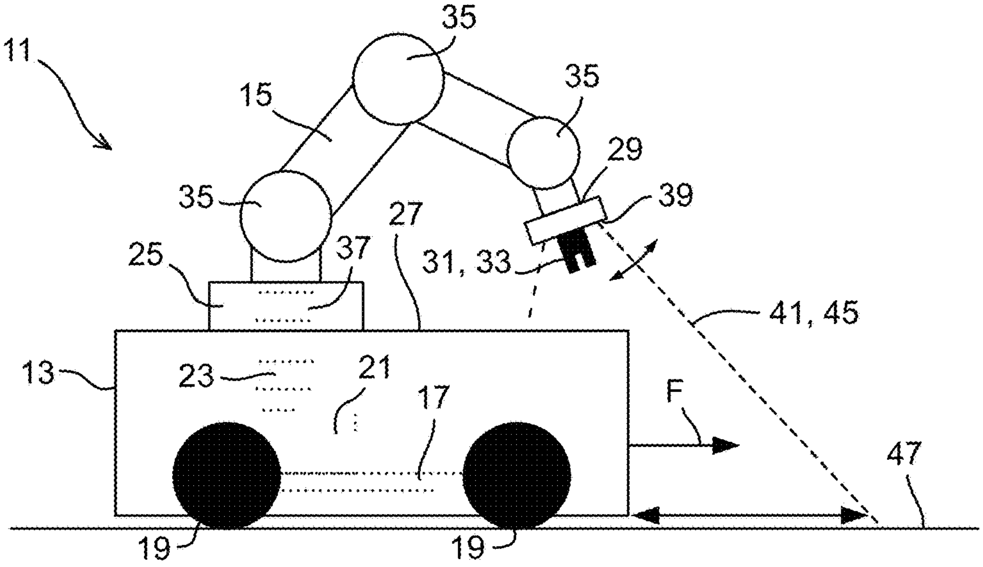
FIG. 3 shows the same embodiment as FIGS. 1 and 2 in a slightly more detailed simplified schematic representation in a view from the side, wherein the mobile machine is operated in the travel mode as in FIG. 2.

The travelable base 13 comprises a chassis 17 with wheels 19, a drive 21 for driving the wheels 19 and a travel control unit 23 (some of these elements are only shown in FIG. 3). The travel control unit 23 is configured to control the travelable base 13. This comprises that the travel control unit 23 can control the travelable base 13 to perform travel movements, in particular by controlling the drive 21 and, if necessary, a steering system, not shown, of the wheels 19.

The movable machine part 15 is arranged at the travelable base 13 and is configured as a robot arm. A first end 25 (proximal with respect to the travelable base 13) of the movable machine part 15 is fixedly connected to the travelable base 13 at an upper side of the travelable base 13, said upper side being part of a surface 27 of the travelable base 13 and functioning as a work surface. An end effector 31 for machining a respective workpiece (not shown) is provided at an opposite second end 29 (distal with respect to the travelable base 13) of the movable machine part 15. Due to its structure and/or its function, the end effector 31 generally poses a risk to persons interacting/collaborating with the mobile machine 11. The end effector 31 therefore represents a hazardous section 33 of the movable machine part 15.

The movable machine part 15 comprises joints 35 and drives (not shown) as well as a work control unit 37 (cf. FIG. 3) that is configured to control the movable machine part 15. This comprises that the work control unit 37 can control the movable machine part 15 to perform working movements, in particular by controlling said drives and the end effector 31. As working movements, the movable machine part 15 can, for example, grip a workpiece, place it on said work surface at the upper side of the travelable base 13 and/or machine it there.

The mobile machine 11 further comprises a securing apparatus 39 that comprises a plurality of sensors (not shown) arranged in a ring shape around the end effector 31. The sensors are configured as non-contact distance sensors that are configured to detect the distance of an object from the respective sensor in a respective detection direction according to the time-of-flight principle. The sensors of the securing apparatus 39 are arranged such that their detection zones overall at least substantially enclose a respective protective volume 41. The respective protective volume 41 can thereby be monitored by means of the securing apparatus 39 with respect to whether an object engages into the respective protective volume 41. The boundaries of the respective protective volume 41 are shown in the Figures by dashed lines.

Due to the arrangement of the securing apparatus 39 at the movable machine part 15, the position and orientation of the respective protective volume 41 depend on the respective position of the movable machine part 15. Furthermore, the extent of the protective volume 41 in the direction facing away from the securing apparatus 39 can be set by defining one or more threshold values for the sensors, up to which a detected distance of an object is to be assessed as an engagement into the protective volume 41.

The mobile machine 11 can be selectively operated in a work mode or in a travel mode. In the work mode, the movable machine part 15 is controlled by the work control unit 37 to perform working movements while the travelable base 13 is stationary. In the travel mode, on the other hand, the travelable base 13 is controlled to perform travel movements while the movable machine part 15 assumes a defined travel position. The travel position can in this respect be dependent on the respective travel movement. When the speed or the direction of the travel movement changes, the movable machine part 15 can therefore change its travel position. Otherwise, however, the movable machine part 15 does not move in the travel mode.

Figure 1:
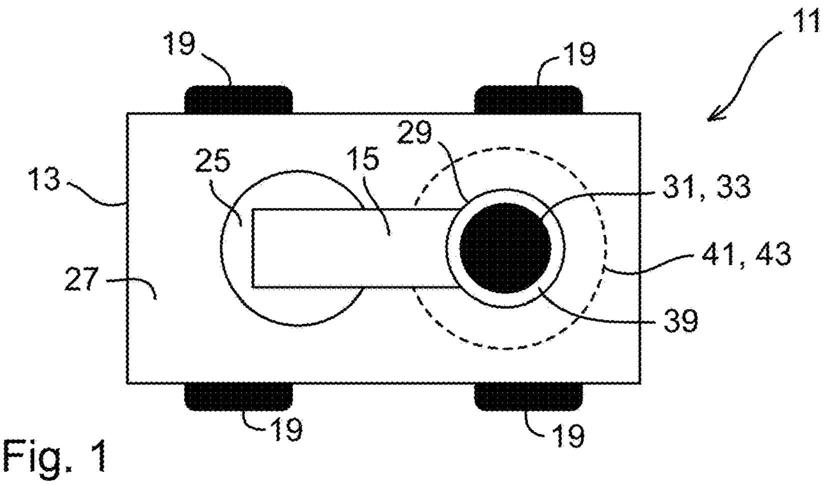
FIG. 1 shows an embodiment of a mobile machine according to the invention in a highly simplified schematic representation in a view from above, wherein the mobile machine is operated in the work mode.

An example of a state of the mobile machine 11 which it can assume in the work mode is shown in FIG. 1. The movable machine part 15 in this respect performs working movements (controlled by the work control unit 37) that also move the end effector 31. In the state shown, the end effector 31 is aligned with the upper side of the surface 27 of the travelable base 13, said upper side functioning as a work surface, for instance to machine a workpiece. The sensors of the securing apparatus 39 are thereby accordingly oriented towards the upper side and monitor an environment 43 of the end effector 31 representing a hazardous section 33. In this state, the protective volume 41 therefore corresponds to this environment 43 of the hazardous section 33. In this respect, the threshold values of the sensors are set such that the protective volume 41 does not extend significantly beyond the end effector 31. The travelable base 13 is stationary in the work mode.

Figure 2:
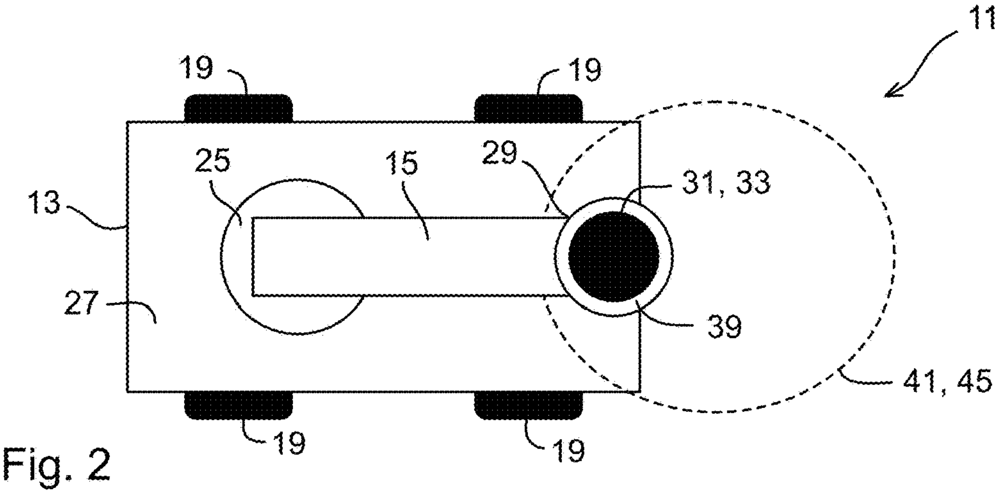
FIG. 2 shows the same embodiment as FIG. 1 in a corresponding representation, wherein the mobile machine is operated in the travel mode.

On the other hand, an example of a state of the mobile machine 11 which it can assume in the travel mode is shown in FIGS. 2 and 3. The movable base 13 in this respect performs travel movements (controlled by the travel control unit 23) while the movable machine part 15 assumes the travel position shown in which the securing apparatus 39 is oriented such that at least some of its sensors monitor an environment 45 of the travelable base 13 that extends beyond the travelable base 13 in the direction of the currently performed travel movement F performed (cf. arrow in FIG. 3). In this state, the protective volume 41 therefore corresponds to this environment 45 of the travelable base 13. The threshold values of the sensors are in this respect set such that the protective volume 41 extends up to a floor 47 on which the mobile machine 11 travels. However, those sensors of the securing apparatus 39 whose detection direction crosses the surface 27 of the travelable base 13 can also simply be deactivated. The corresponding edge of the protective volume 41 is therefore shown with a dotted line in FIG. 3, unlike the opposite edge of the protective volume 41 extending up to the floor 47.

If, by means of the securing apparatus 39, an engagement of an object into the respective protective volume 41 (in the work mode into the environment 43 of the hazardous section 33 or in the travel mode into the environment 45 of the travelable base 13) is determined based on data acquired by means of the sensors of the securing apparatus 39, in order to avoid endangering objects (in particular persons) in the environment of the mobile machine 11, a safety-oriented reaction is triggered in each case that, in the work mode, comprises adapting the currently performed working movement and, in the travel mode, comprising adapting the currently performed travel movement. In particular, the working movement or the travel movement is modified in this respect. For example, the movable machine part 15 or the travelable base 13 can be controlled to evade the respective object, can be slowed down or can even be stopped completely.

As already mentioned, the travel position which the movable machine part 15 assumes in the travel mode can be dependent on the currently performed travel movement F of the travelable base 13. In other words, it can be provided that the movable machine part 15 assumes a first defined travel position during a first travel movement of the travelable base 13 and assumes a second defined travel position different from the first defined travel position during a second travel movement of the travelable base 13 different from the first defined travel position. The first and the second movement can differ, for instance, in terms of their respective speed and/or direction. The first and the second travel position can, for example, differ (at least among other things) with respect to an angular orientation of the end effector 31 or of the securing apparatus 39.

For example, it can be provided that, in the event of a change in the speed of the travel movement F, the movable machine part 15 is adjusted from its respective travel position into another travel position such that the securing apparatus 39 is tilted (at least among other things) about a horizontal axis (cf. the curved double arrow in FIG. 3). The tilting then changes how far the environment 45 of the travelable base 13 monitored by means of the sensors of the securing apparatus 39 extends beyond the travelable base 13 in the direction of the travel movement F (cf. horizontal double arrow in FIG. 3). In this respect, it is expedient if the monitored environment 45 extends further at a higher speed of the travel movement F than at a lower speed so that objects in front of the travelable base 13 in the direction of travel can be detected in good time in each case.

Furthermore, in the event of a change in the direction of the travel movement F, it can be expedient to move the movable machine part from its respective travel position into another travel position such that the securing apparatus 39 is oriented (for example by rotating the movable machine part 15 about a vertical axis by an angle corresponding to the change in direction) such that the monitored environment 45 of the travelable base 13 extends beyond the travelable base 13 in the new direction of travel. In this way, an environment 45 in front of the mobile machine 11 can, for example, be monitored during forward travel of the mobile machine 11 and an environment 45 behind the mobile machine 11 can be monitored during backward travel of the mobile machine 11.

The mobile machine 11 is thereby flexibly usable and safely operable in the process, but simultaneously manages with comparatively few components since the same securing apparatus 39 is used, on the one hand, in the work mode to monitor an environment 43 of the hazardous section 33 and to trigger a corresponding safety-related reaction in the event of an engagement into the environment 43 and, on the other hand, is used in the travel mode to monitor an environment 45 of the travelable base 13 and to trigger a corresponding safety-related reaction in the event of an engagement into the environment 45. The mobile machine 11 can thereby be manufactured comparatively cheaply, can be comparatively light and can simultaneously have a comparatively high level of functional safety.

REFERENCE NUMERALS

11 mobile machine
13 travelable base
15 movable machine part
17 chassis
19 wheel
21 drive
23 travel control unit
25 first end of the movable machine part
27 surface of the travelable base
29 second (free) end of the movable machine part
31 end effector
33 hazardous section
35 joint
37 work control unit
39 securing apparatus
41 protective volume
43 environment of the hazardous section
45 environment of the travelable base
47 floor
F travel movement

The invention claimed is:

1. A method for the safe operation of a mobile machine, wherein the mobile machine comprises a travelable base; a movable machine part arranged at the travelable base and comprising a hazardous section; and a securing apparatus arranged at the movable machine part and comprising one or more sensors,
wherein the method comprises:
that the mobile machine is selectively operated in a work mode or in a travel mode;
that in the work mode:
the travelable base is stationary,
the movable machine part performs working movements, and
the securing apparatus is in this respect moved along such that it monitors a protective volume, which corresponds to a defined environment of the hazardous section, by means of the one or more sensors,
wherein, in the event of an object engaging into the protective volume, a safety-related reaction is triggered that comprises adapting the working movement; and
that in the travel mode:
the travelable base performs travel movements,
the movable machine part assumes a defined travel position, and
the securing apparatus is in this respect oriented such that it monitors a protective volume, which corresponds to a defined environment of the travelable base, by means of the one or more sensors,
wherein, in the event of an object engaging into the protective volume, a safety-related reaction is triggered that comprises adapting the travel movement and
wherein the mobile machine monitors said environment of the travelable base in the travel mode solely by means of the securing apparatus arranged at the movable machine part.

2. The method according to claim 1, wherein the safe operation of the mobile machine is part of a human-robot interaction.

3. The method according to claim 1, wherein the mobile machine is a mobile robot and the movable machine part is a robot arm.

4. The method according to claim 3, wherein the hazardous section is arranged at a free end of the movable machine part.

5. The method according to claim 1, wherein said environment of the hazardous section extends around the hazardous section in at least one spatial plane such that the hazardous section is accessible from the outside only through this environment at least in directions in parallel with the spatial plane.

6. The method according to claim 1, wherein the sensors of the securing apparatus are non-contact distance sensors that are configured to detect the distance of a respective object from the respective sensor in a respective detection direction.

7. The method according to claim 6, wherein the extent of the protective volume along a respective detection direction is defined by a respective threshold value, and wherein, for at least some of the sensors, the respective threshold value is different in the travel mode than in the work mode.

8. The method according to claim 7, wherein the respective threshold value is greater in the travel mode than in the work mode.

9. The method according to claim 6, wherein the travelable base has a surface, and wherein, in the travel mode, those sensors whose detection direction crosses the surface of the travelable base are deactivated.

10. The method according to claim 1, wherein said environment of the travelable base extends beyond the travelable base at least in the direction of the respective travel movement.

11. The method according to claim 1, wherein the travel position which the movable machine part assumes in the travel mode is dependent on the speed and/or on the direction of the respective travel movement.

12. The method according to claim 1, wherein, in the travel mode, during a travel movement of the travelable base in a first direction, the movable machine part assumes a first travel position, in which the securing apparatus is oriented such that the monitored protective volume corresponds to a first environment of the travelable base that extends beyond the travelable base in the first direction and, during a travel movement of the travelable base in a second direction different from the first direction, said movable machine part assumes a second travel position in which the securing apparatus is oriented such that the monitored protective volume corresponds to a second environment of the travelable base that extends beyond the travelable base in the second direction.

13. The method according to claim 1, wherein, in the travel mode, during a travel movement of the travelable base at a first speed, the movable machine part assumes a first travel position, in which the securing apparatus is oriented such that the monitored protective volume corresponds to a first environment of the travelable base that extends beyond the travelable base in the direction of the travel movement, and, during a travel movement of the travelable base at a second speed that is greater than the first speed, said movable machine part assumes a second travel position in which the securing apparatus is oriented such that the monitored protective volume corresponds to a second environment of the travelable base that extends further beyond the travelable base in the direction of the travel movement than the first environment.

14. The method according to claim 1, wherein the mobile machine comprises a travel control unit for controlling the travelable base and a work control unit for controlling the movable machine part, wherein the securing apparatus evaluates data acquired by the sensors with respect to an engagement into the respective protective volume and, in the event of an engagement, outputs a corresponding signal to the respective control unit that, when it receives the corresponding signal, triggers the respective safety-related reaction.

15. The method according to claim 1, wherein the mobile machine comprises a travel control unit for controlling the travelable base and a work control unit for controlling the movable machine part, wherein the securing apparatus outputs data acquired by the sensors to the work control unit and/or to the travel control unit, and wherein the travel control unit and/or the work control unit evaluates/evaluates the data received from the securing apparatus with respect to an engagement into the respective protective volume and, in the event of an engagement, triggers/trigger the respective safety-related reaction.

16. A mobile machine that comprises a travelable base; a travel control unit for controlling the travelable base; a movable machine part arranged at the travelable base and comprising a hazardous section; a work control unit for controlling the movable machine part; and a securing apparatus arranged at the movable machine part and comprising one or more sensors, wherein the mobile machine is selectively operable in a work mode, in which the movable machine part is controlled by the work control unit to perform working movements while the travelable base is stationary, or is operable in a travel mode in which the travelable base is controlled by the travel control unit to perform travel movements while the movable machine part assumes a defined travel position, wherein the securing apparatus is configured to monitor a respective protective volume with respect to an engagement into the protective volume, wherein the protective volume corresponds to a defined environment of the hazardous section in the work mode and corresponds to a defined environment of the travelable base in the travel mode, wherein the work control unit is configured, in the work mode, in the event of an object engaging into the respective protective volume, to at least adapt the working movement as a safety-related reaction, wherein the travel control unit is configured, in the travel mode, in the event of an object engaging into the respective protective volume, to at least adapt the travel movement as a safety-related reaction, and wherein the mobile machine monitors said environment of the travelable base in the travel mode solely by means of the securing apparatus arranged at the movable machine part.

17. The mobile machine according to claim 16, wherein the mobile machine is configured to be operated with a method for the safe operation of a mobile machine in accordance with claim 1.

18. The mobile machine according to claim 16, wherein the mobile machine is a mobile robot.

19. The mobile machine according to claim 16, wherein the movable machine part is a robot arm.

20. The mobile machine according to claim 16, wherein said one or more sensors are one or more non-contact distance sensors.

21. A method for the safe operation of a mobile machine, wherein the mobile machine comprises a travelable base; a movable machine part arranged at the travelable base and comprising a hazardous section; and a securing apparatus arranged at the movable machine part and comprising one or more sensors, wherein the method comprises:

that the mobile machine is selectively operated in a work mode or in a travel mode;

that in the work mode:

the travelable base is stationary, the movable machine part performs working movements, and the securing apparatus is in this respect moved along such that it monitors a protective volume, which corresponds to a defined environment of the hazardous section, by means of the one or more sensors, wherein, in the event of an object engaging into the protective volume, a safety-related reaction is triggered that comprises adapting the working movement; and that in the travel mode:

the travelable base performs travel movements, the movable machine part assumes a defined travel position, and the securing apparatus is in this respect oriented such that it monitors a protective volume, which corresponds to a defined environment of the travelable base, by means of the one or more sensors, wherein, in the event of an object engaging into the protective volume, a safety-related reaction is triggered that comprises adapting the travel movement, and wherein the travel position which the movable machine part assumes in the travel mode is dependent on the speed and/or on the direction of the respective travel movement.

* * * * *